(12) United States Patent
Trainer et al.

(10) Patent No.: US 12,311,786 B2
(45) Date of Patent: May 27, 2025

(54) POWER ELECTRONICS CONVERTER

(71) Applicant: ROLLS-ROYCE plc, London (GB)

(72) Inventors: David R. Trainer, Derby (GB); Francisco Javier Chivite Zabalza, Stafford (GB); Mark Sweet, Chesterfield (GB); Matthew C. Morris, Glasgow (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/139,672

(22) Filed: Apr. 26, 2023

(65) Prior Publication Data

US 2023/0373319 A1    Nov. 23, 2023

(30) Foreign Application Priority Data

May 23, 2022    (GB) ...................................... 2207512

(51) Int. Cl.
| | |
|---|---|
| *H02M 1/32* | (2007.01) |
| *B60L 50/00* | (2019.01) |
| *B64C 27/10* | (2023.01) |
| *B64D 27/24* | (2006.01) |
| *H02M 7/219* | (2006.01) |
| *H02M 7/797* | (2006.01) |

(Continued)

(52) U.S. Cl.
CPC .............. *B60L 50/00* (2019.02); *B64C 27/10* (2013.01); *B64D 27/24* (2013.01); *H02M 1/325* (2021.05); *H02M 7/797* (2013.01); *H02P 27/06* (2013.01); *B60L 2200/10* (2013.01); *B60L 2210/30* (2013.01); *B64D 27/026* (2024.01)

(58) Field of Classification Search
CPC .. B60L 50/00; B60L 2200/10; B60L 2210/30; B64C 27/10; B64D 27/24; B64D 27/026; H02M 1/325; H02M 7/797; H02M 1/32; H02M 7/219; H02P 27/06
USPC .......................................................... 307/9.1
See application file for complete search history.

(56) References Cited

U.S. PATENT DOCUMENTS

| | | |
|---|---|---|
| 11,271,487 B2 | 3/2022 | Bruce |
| 2009/0168276 A1* | 7/2009 | Chen ................... H02H 11/002 |
| | | 361/33 |

(Continued)

FOREIGN PATENT DOCUMENTS

| | | |
|---|---|---|
| DE | 10 2013 213 854 A1 | 2/2014 |
| EP | 2 779 392 A1 | 9/2014 |

(Continued)

OTHER PUBLICATIONS

Nov. 3, 2022 Search and Examination Report issued in British Patent Application No. GB2207512.1.

(Continued)

*Primary Examiner* — Rexford N Barnie
*Assistant Examiner* — Xuan Ly
(74) *Attorney, Agent, or Firm* — Oliff PLC

(57) ABSTRACT

A power electronics converter comprising: first and second input terminals; first and second DC output terminals; a branch comprising first and second semiconductor switches connected in series between the first and second DC output terminals, the first input terminal connected to a node between the first and second semiconductor switches; a DC link capacitor connected between the first and second DC output terminals; and a reverse biased DC link diode connected across the DC link capacitor.

16 Claims, 12 Drawing Sheets

(51) Int. Cl.
H02P 27/06 (2006.01)
B64D 27/02 (2006.01)

(56) References Cited

U.S. PATENT DOCUMENTS

| | | | | |
|---|---|---|---|---|
| 2012/0262966 A1* | 10/2012 | Luerkens | ............... | H02M 7/066 363/127 |
| 2014/0354254 A1 | 12/2014 | Iwamoto et al. | | |
| 2014/0362479 A1 | 12/2014 | Park et al. | | |
| 2018/0287482 A1* | 10/2018 | Schult | ..................... | H02M 1/14 |
| 2019/0173391 A1 | 6/2019 | Elserougi et al. | | |
| 2020/0119634 A1* | 4/2020 | Perkio | ..................... | H02M 1/32 |
| 2020/0343826 A1* | 10/2020 | Izquierdo Gil | ........ | B64D 41/00 |
| 2023/0182908 A1* | 6/2023 | Kumar | ................... | B64D 27/33 244/53 R |

FOREIGN PATENT DOCUMENTS

KR  10-2021-0133448 A  11/2021
WO  2020/198960 A1  10/2020

OTHER PUBLICATIONS

Oct. 20, 2023 Search Report issued in European Patent Application No. 23169651.9.
Jingnan Zhang et al.; "Research on IGBTs-Based Superconducting DC Current Limiter"; IEEE Transactions on Applied Superconductivity; Mar. 2019; vol. 29; No. 2; pp. 1-6.

* cited by examiner

PHASE 1
CAPACITOR
DISCHARGE

PHASE 2
CURRENT
COMMUTATES
TO DIODE

POWER ELECTRONICS CONVERTER

CROSS-REFERENCE TO RELATED APPLICATIONS

This specification is based upon and claims the benefit of priority from United Kingdom Patent Application No. 2207512.1, filed on 23 May 2022, the entire contents of which are incorporated herein by reference.

TECHNICAL FIELD

This disclosure relates to power electronics converters for use in electrical power systems, which may be of particular utility in transport applications including, but not limited to, aerospace.

BACKGROUND

In aerospace, aircraft and their power and propulsion systems are becoming increasingly electric in their design. So-called 'more electric engines' (MEEs) and 'more electric aircraft' (MEAs) may derive all or substantially all of their propulsive thrust from turbomachinery but make greater use of electrical power compared with conventional platforms. They may, for example, use electrical power to power auxiliary systems which have previously been powered mechanically or pneumatically, or may use spool-coupled electrical machines to transfer power to, from and between engine spools to provide improvements in engine operability and efficiency. In hybrid electric aircraft, the propulsive thrust is derived from engines (e.g. gas turbine engines) and from other sources, typically batteries and/or fuel cells which supply electrical power to engine- or propulsor-coupled electrical machines.

Some proposed platforms include DC electrical networks which receive electrical power from engine-driven electrical machines via AC to DC converters (i.e. rectifiers). FIG. 4A illustrates a typical arrangement in which a three-phase electrical generator 310, which may be coupled with and driven by a spool of a gas turbine engine, is connected with a DC network 330 via a two-level AC-DC converter 320. Each phase leg of the converter 320 has two transistors (e.g. IGBTs), each of which is connected in anti-parallel with an associated diode. To rectify the AC output of the generator 310, for each phase leg current is commutated between the upper diode and the lower transistor, with each conducting for half of each AC cycle.

FIG. 4B illustrates the effect of a fault in the DC network, which places a low impedance across the network terminals. In this case both the DC and AC sides of the converter assume a low voltage condition, which in the limit may be zero Volts. In this condition there is no voltage to reverse bias the diodes, which means the AC-DC converter loses control and in effect reverts to being an uncontrolled diode rectifier. The level of current supplied to the DC network 330 in the faulted condition will therefore depend mainly on the voltage generated by, and the impedance of, the electrical machine 310.

In some applications it is acceptable for the converter to operate as an uncontrolled diode rectifier when there is a DC network fault. In other applications, however, including aerospace applications, this mode of operation may be highly undesirable because the electrical machines may generate high voltages and/or may have low impedances, such that the high levels of fault current will be supplied to the fault site in the DC network.

SUMMARY

According to a first aspect, there is provided a power electronics converter comprising:
first and second input terminals;
first and second DC output terminals;
a branch comprising first and second semiconductor switches connected in series between the first and second DC output terminals, the first input terminal connected to a node between the first and second semiconductor switches, the second input terminal connected to the second DC output terminal;
a DC link capacitor connected between the first and second DC output terminals; and
a reverse biased DC link diode connected across the DC link capacitor.

An advantage of the DC link diode connected across the DC link capacitor is that, during a DC fault condition, the high pulse of current that would otherwise be experienced by the converter switches is reduced or eliminated by being bypassed through the DC link diode. This ensures that the converter is not damaged by a DC network fault and may be optimised for normal operation rather than being built with higher current capacity diodes that are only needed to withstand infrequent DC network faults. This is particularly advantageous for aerospace applications because the use of a single DC link diode can result in weight savings compared with using multiple diodes in the converter that are sufficient to withstand current loads resulting from a DC network fault.

In some examples, the first and second semiconductor switches may each comprise a transistor connected in anti-parallel with a diode. The transistor may be an IGBT or MOSFET.

In some examples, the first and second semiconductor switches may each consist of a MOSFET, i.e. with no diode connected in parallel. In such examples, the current capacity of the DC link diode is greater than that of the body diode of each MOSFET, for example between around 5 and 10 times greater.

Where the power electronics converter is an AC to DC converter, the power electronics converter may comprise a plurality of said branches connected between the first and second DC output terminals, the node between the first and second semiconductor switches of each branch being connectable to a respective phase of an electrical machine.

The power electronics converter may have a single branch for each phase, in which the second input terminal is connected to the second DC output terminal. The power electronics converter may alternatively comprise an H-bridge converter for each phase, in which the branch is a first branch, the power electronics converter comprising a second branch comprising first and second semiconductor switches connected in series between the first and second DC output terminals, the second input terminal connected to a node between the first and second semiconductor switches of the second branch.

The power electronics converter may be rated to convert over 30 kW of electrical power.

The power electronics converter may comprise a plurality of said branches connected between the first and second DC output terminals, the node between the first and second semiconductor switches of each branch being connectable to a respective phase of an electrical machine.

According to a second aspect there is provided an electrical power system comprising an electrical machine, a DC network and a power electronics converter according to the first aspect, the electrical machine connected to the node of the power electronics converter and the DC network connected across the first and second output terminals.

The electrical machine may comprise a plurality of phases and the power electronics converter a respective plurality of branches, each phase of the electrical machine connected to the node between the first and second semiconductor switches of a respective branch of the power electronics converter.

The electrical machine may for example comprise three phases. The power electronics converter may comprise three branches.

The electrical power system may comprise a controller configured to provide switching signals to each switch of the power electronics converter.

The controller may be configured to detect a DC fault in the DC network and, upon detecting the DC fault, open each of the semiconductor switches until a detected DC level across the DC network falls below a predefined threshold.

According to a fourth aspect, there is provided an aircraft power and propulsion system comprising: a gas turbine engine; and an electrical power system according to the second aspect. The electrical machine of the electrical power system is mechanically coupled with a spool of the gas turbine engine.

The power electronics converter may be a unidirectional AC to DC converter (i.e. a rectifier) or a bidirectional AC-DC converter capable of operating as either a rectifier or an inverter depending on an operating mode of the electrical machine.

According to a fifth aspect, there is provided an aircraft comprising the power and propulsion system of the fourth aspect. The aircraft may be a solely gas-turbine-powered aircraft (e.g. a more electric aircraft) or a hybrid electric aircraft.

The skilled person will appreciate that except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
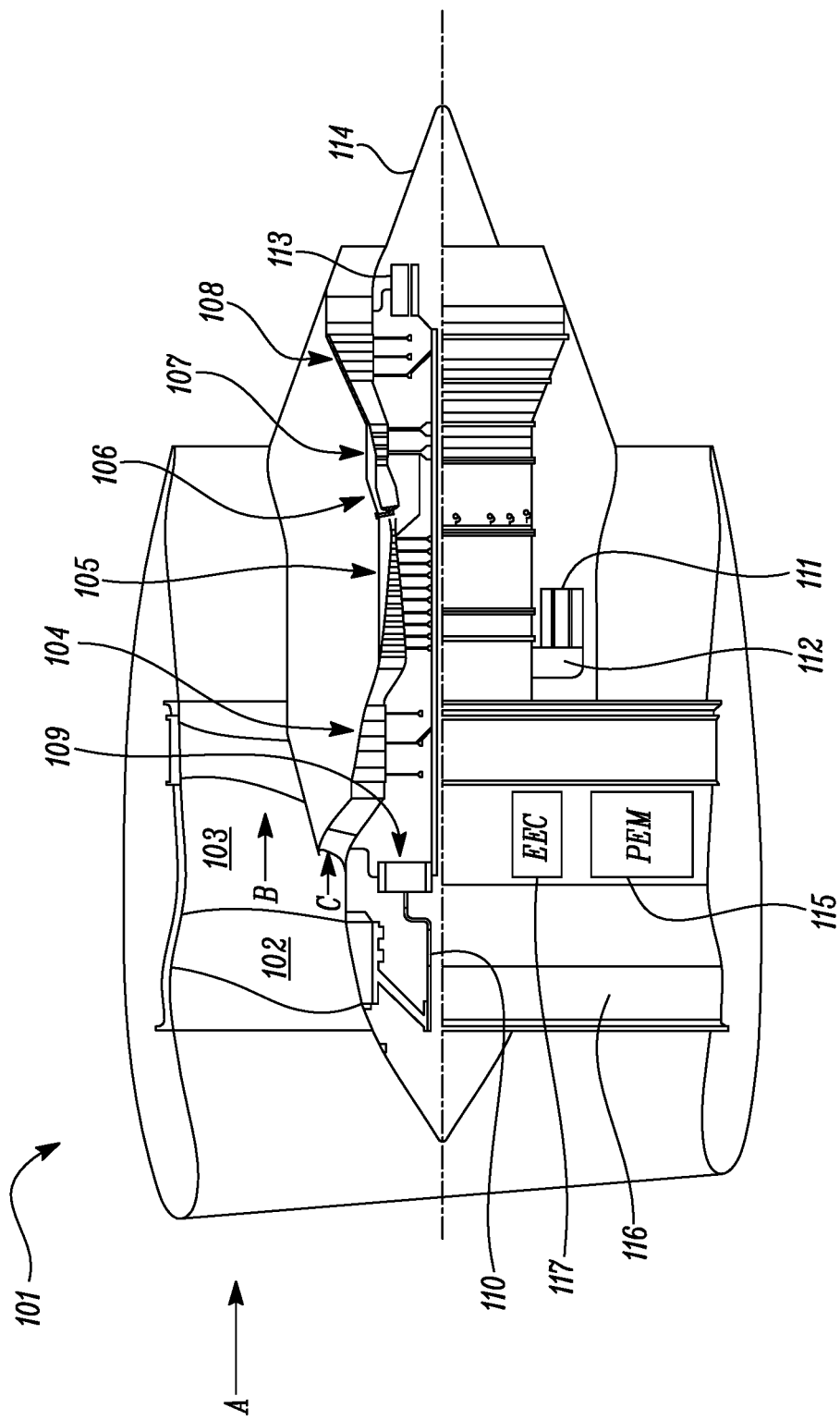
FIG. 1 shows a general arrangement of a turbofan engine for an aircraft.

A general arrangement of an engine 101 for an aircraft is shown in FIG. 1. The engine 101 is of turbofan configuration, and thus comprises a ducted fan 102 that receives intake air A and generates two pressurised airflows: a bypass flow B which passes axially through a bypass duct 103 and a core flow C which enters a core gas turbine.

The core gas turbine comprises, in axial flow series, a low-pressure compressor 104, a high-pressure compressor 105, a combustor 106, a high-pressure turbine 107, and a low-pressure turbine 108.

In operation, the core flow C is compressed by the low-pressure compressor 104 and is then directed into the high-pressure compressor 105 where further compression takes place. The compressed air exhausted from the high-pressure compressor 105 is directed into the combustor 106 where it is mixed with fuel and the mixture is combusted. The resultant hot combustion products then expand through, and thereby drive, the high-pressure turbine 107 and in turn the low-pressure turbine 108 before being exhausted to provide a small proportion of the overall thrust.

The high-pressure turbine 107 drives the high-pressure compressor 105 via an interconnecting shaft. The low-pressure turbine 108 drives the low-pressure compressor 104 via another interconnecting shaft. Together, the high-pressure compressor 105, high-pressure turbine 107, and associated interconnecting shaft form part of a high-pressure spool of the engine 101. Similarly, the low-pressure compressor 104, low-pressure turbine 108, and associated interconnecting shaft form part of a low-pressure spool of the engine 101. Such nomenclature will be familiar to those skilled in the art. Those skilled in the art will also appreciate that whilst the illustrated engine has two spools, other gas turbine engines have a different number of spools, e.g., three spools.

The fan 102 is driven by the low-pressure turbine 108 via a reduction gearbox in the form of a planetary-configuration epicyclic gearbox 109. Thus in this configuration, the low-pressure turbine 108 is connected with a sun gear of the gearbox 109. The sun gear is meshed with a plurality of planet gears located in a rotating carrier, which planet gears are in turn meshed with a static ring gear. The rotating carrier drives the fan 102 via a fan shaft 110. It will be appreciated that in alternative embodiments a star-configuration epicyclic gearbox (in which the planet carrier is static and the ring gear rotates and provides the output) may be used instead, and indeed that the gearbox 109 may be omitted entirely so that the fan 102 is driven directly by the low-pressure turbine 108.

It is increasingly desirable to facilitate a greater degree of electrical functionality on the airframe and on the engine. To this end, the engine 101 of FIG. 1 comprises one or more rotary electrical machines, generally capable of operating both as a motor and as a generator. The number and arrangement of the rotary electrical machines will depend to some extent on the desired functionality. Some embodiments of the engine 101 include a single rotary electrical machine 111 driven by the high-pressure spool, for example by a core-mounted accessory drive 112 of conventional configuration. Such a configuration facilitates the generation of electrical power for the engine and the aircraft and the driving of the high-pressure spool to facilitate starting of the engine in place of an air turbine starter. Other embodiments, including the one shown in FIG. 1, comprise both a first rotary electrical machine 111 coupled with the high pressure spool and a second rotary electrical machine 113 coupled with the low pressure spool. In addition to generating electrical power and the starting the engine 101, having both first and second rotary machines 111, 113, connected by power electronics, can facilitate the transfer of mechanical power between the high and lower pressure spools to improve operability, fuel consumption etc.

As mentioned above, in FIG. 1 the first rotary electrical machine 111 is driven by the high-pressure spool by a core-mounted accessory drive 112 of conventional configuration. In alternative embodiments, the first electrical machine 111 may be mounted coaxially with the turbomachinery in the engine 101. For example, the first electrical machine 111 may be mounted axially in line with the duct between the low- and high-pressure compressors 104 and 105. In FIG. 1, the second electrical machine 113 is mounted in the tail cone 114 of the engine 101 coaxially with the turbomachinery and is coupled to the low-pressure turbine 108. In alternative embodiments, the second rotary electrical machine 113 may be located axially in line with low-pressure compressor 104, which may adopt a bladed disc or bladed drum configuration to provide space for the second rotary electrical machine 113. It will of course be appreciated by those skilled in the art that any other suitable location for the first and (if present) second electrical machines may be adopted.

The first and second electrical machines 111, 113 are connected with power electronics. Extraction of power from or application of power to the electrical machines is performed by a power electronics module (PEM) 115. In the present embodiment, the PEM 115 is mounted on the fan case 116 of the engine 101, but it will be appreciated that it may be mounted elsewhere such as on the core of the gas turbine, or in the vehicle to which the engine 101 is attached, for example.

Control of the PEM 115 and of the first and second electrical machines 111 and 113 is in the present example performed by an engine electronic controller (EEC) 117. In the present embodiment the EEC 117 is a full-authority digital engine controller (FADEC), the configuration of which will be known and understood by those skilled in the art. It therefore controls all aspects of the engine 101, i.e. both of the core gas turbine and the first and second electrical machines 111 and 113. In this way, the EEC 117 may holistically respond to both thrust demand and electrical power demand.

The one or more rotary electrical machines 111, 113 and the power electronics 115 may be configured to output to or receive electric power from one, two or more dc busses. The dc busses allow for the distribution of electrical power to other engine electrical loads and to electrical loads on the airframe.

Those skilled in the art will appreciate that the gas turbine engine 101 described above may be regarded as a 'more electric' gas turbine engine because of the increased role of the electrical machines 111, 113 compared with those of conventional gas turbines.

Figure 2A:
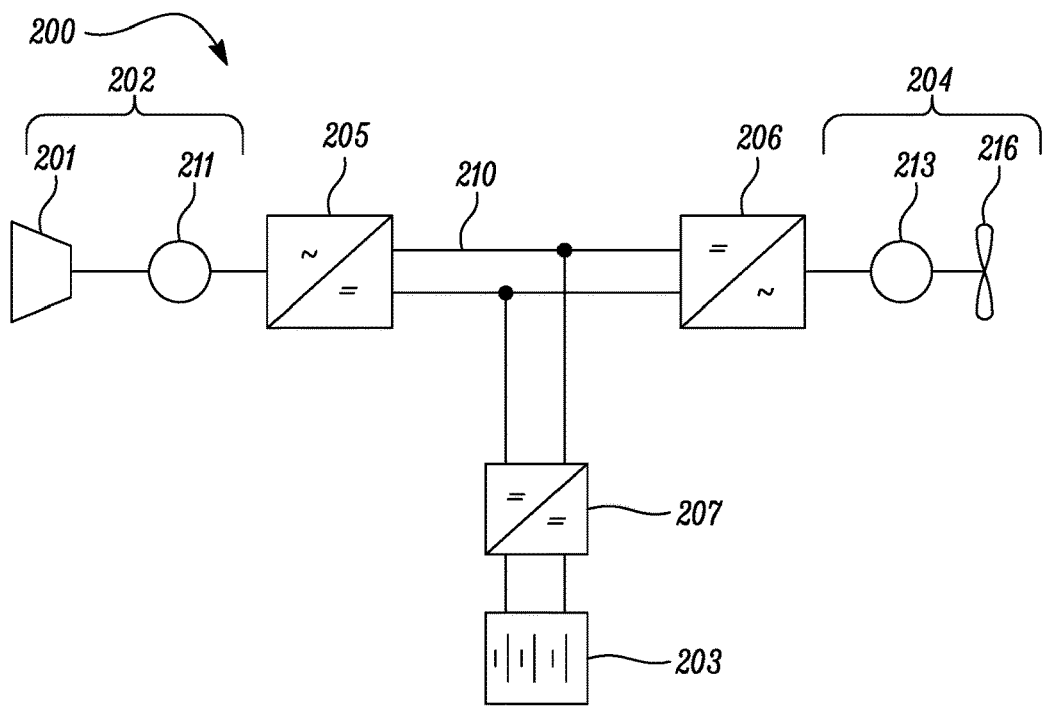
FIG. 2A is a schematic illustration of a hybrid electric aircraft propulsion system.
Figure 2B:
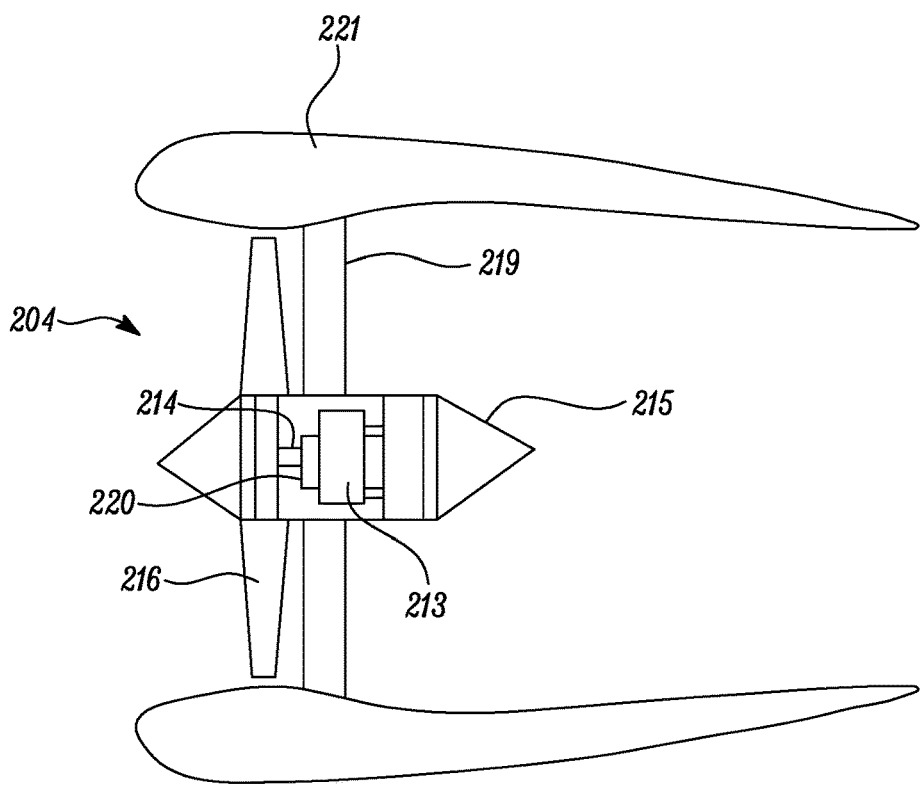
FIG. 2B illustrates an electrically powered propulsor such as may be used in a hybrid electric propulsion system.

FIG. 2A illustrates an exemplary propulsion system 200 of a hybrid electric aircraft. The propulsion system 200 includes a generator set 202 comprising a gas turbine engine 201 and electrical generator 211, and a battery pack 203. Both the generator set 202 and the battery pack 203 are used as energy sources to power a motor-driven propulsor 204, an example of which is shown in FIG. 2B.

The illustrated propulsion system 200 further comprises an AC/DC converter 205, a dc distribution bus 210, a DC/AC converter 206 and a DC/DC converter 207. It will be appreciated that whilst one generator set 202 and one propulsor 204 are illustrated in this example, a propulsion system 200 may include more than one generator set 202 and/or one or more propulsor 204.

A shaft or spool of the engine 201 is coupled to and drives the rotation of a shaft of the generator 211 which thereby produces alternating current. The AC/DC converter 205, which faces the generator 211, converts the alternating current into direct current which is fed to various electrical systems and loads via the dc distribution bus 210. These electrical systems include non-propulsive loads (not shown in FIG. 2A) and the motor-driven propulsor 204, which comprises a motor 213 which drives a propulsor 204 via the DC/AC converter 206.

The battery pack 203, which may be made up of a number of battery modules connected in series and/or parallel, is connected to the dc distribution bus 210 via the DC/DC converter 207. The DC/DC converter 207 converts between a voltage of the battery pack 203 and a voltage of the dc distribution bus 210. In this way, the battery pack 203 can replace or supplement the power provided by the generator set 202 (by discharging and thereby feeding the DC distribution bus 210) or can be charged using the power provided by the generator set 202 (by being fed by the dc distribution bus 210).

Referring to FIG. 2B, in this example the propulsor 204 takes the form of a ducted fan. The fan 216 is enclosed within a fan duct 219 defined within a nacelle 221 and is mounted to a core nacelle 215. The fan 216 is driven by the electrical machine 213 via a drive shaft 214, both of which may also be thought of as components of the propulsor 204. In this embodiment a gearbox 220 is provided between the electrical machine 213 and the drive shaft 214.

The electrical machine 213 is supplied with electric power from a power source, for example the generator set 202 and/or the battery 203 via the dc bus 210. The electrical machine 213 of the propulsor, and indeed the electrical machine 211 of the generator set 202, may be of any suitable type, for example of the permanent magnet synchronous type.

Those skilled in the art will recognise the propulsion system 200 of FIGS. 2A-B to be of the series hybrid type. Other hybrid electric propulsion systems are of the parallel type, while still others are of the turboelectric type or have features of more than one type. The configuration of the more electric engine 101 of FIG. 1 may be considered similar to a parallel hybrid system, with the main distinction being the roles of the electrical machines. For example, the electrical machines of a more electric engine are generally only used in motor mode to start the engine and to improve engine operability, whereas the electric machines of a parallel hybrid propulsion system are used to motor the spools to meaningfully add to the amount of propulsive thrust produced by the turbomachinery.

Those skilled in the art will also appreciate that the hybrid architecture illustrated in FIG. 2A is only one example, and other architectures are known and will occur to those skilled in the art.

Figure 3A:
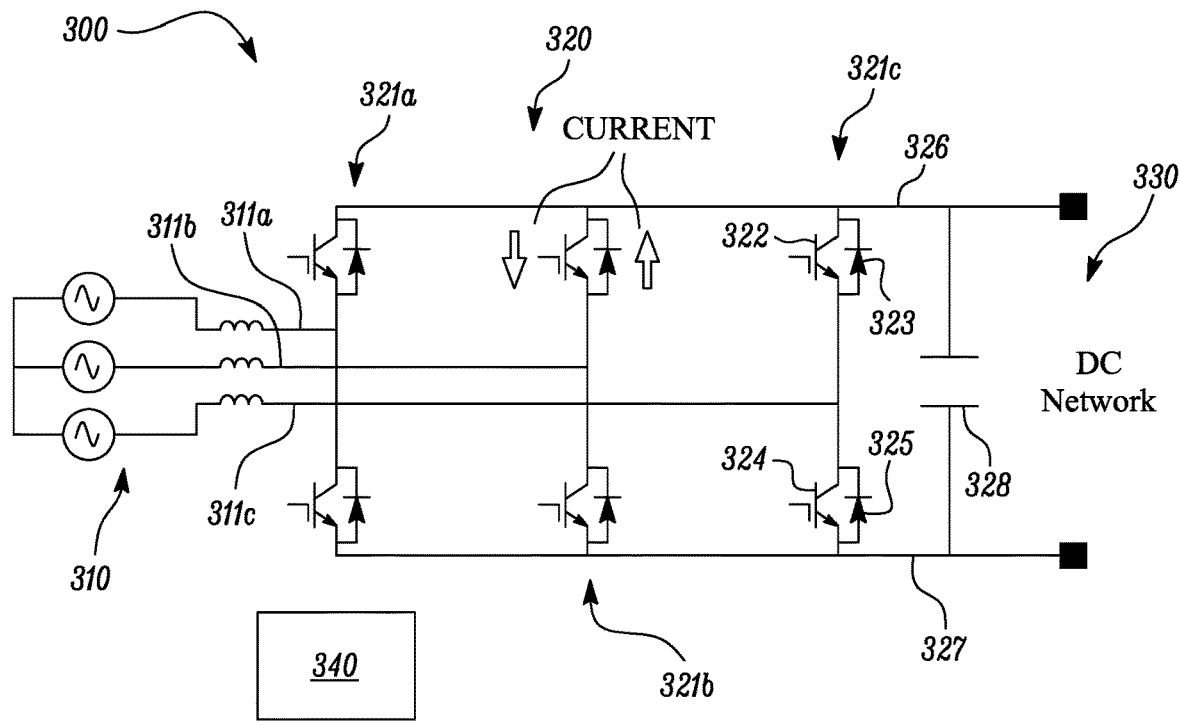
FIG. 3A illustrates a portion of an exemplary electrical power system in which an AC-DC converter connects a 3-phase electrical generator with a DC network.

FIG. 3A illustrates a portion of an electrical power system 300 such as may be used in the aircraft and engine systems described above with reference to FIG. 1 and FIGS. 2A-B. The electrical power system 300 includes an electrical machine 310 operable as a generator to generate AC, an AC-DC power electronics converter 320 operable to rectify the AC received from the electrical machine 310 and output DC, a DC electrical network 330 which receives the DC power output by the converter 320, and a controller 340 which exercises control over the electrical power system 300 including the converter 320.

In this example the electrical machine 310 is a three-phase machine which outputs its three phases through three phase connections 311a, 311b, 311c. It will however be understood that other numbers of phases (e.g. four) and other connection arrangements could be used. The electrical machine 310 can be of any type and configuration suitable for the application requirements. In one specific embodiment it is a permanent magnet synchronous machine (PMSM) of radial flux configuration, but other types of machine including wound field and switched reluctance, and other configurations such axial flux and transverse flux, are also contemplated. The electrical machine 310 may be specifically configured as a generator, or it may be operable in both motor and generator modes (e.g. where the electrical machine 310 is a 'starter-generator' of a gas turbine engine).

The illustrated power electronics converter 320 is a two-level, three-phase full-bridge rectifier with insulated gate bipolar transistors (IGBTs). It includes three phase legs 321a, 321b, 321c, each of which is connected to a corresponding one of the phase connections 311a, 311b, 311c from which it receives an AC supply. Each phase leg 321a, 321b, 321c includes two branches: a first (upper) branch which includes a transistor 322 and associated diode 323 connected in anti-parallel with the transistor 322 and a second (lower) branch which includes a transistor 324 and associated diode 325 connected in anti-parallel with the transistor 324. The upper branch of each phase leg 321a, 321b, 321c is connected with a first DC output 326. The lower branch of each phase leg 321a, 321b, 321c is connected with a second DC output 327. The first and second DC outputs 326, 327 connect with the DC electrical network 330, whereby the DC electrical network 330 is supplied with DC electrical power. A DC link capacitor 328 is also shown, the function of which will be familiar to those skilled in the art of power electronics.

During normal operation of the converter 320 as a rectifier, the controller 340 uses pulse width modulation to control the switching of the transistors to commutate current between the upper and lower branches of the phase legs to affect suitable rectification of the AC supply to a DC output provided to the DC outputs 326, 327. In this example, when current flows through the upper branch of a phase leg to the first DC output 326 it flows through the diode 323, whereas when current flows through the lower branch of the phase leg to the second output 327 it flows through the transistor 324.

Figure 3B:
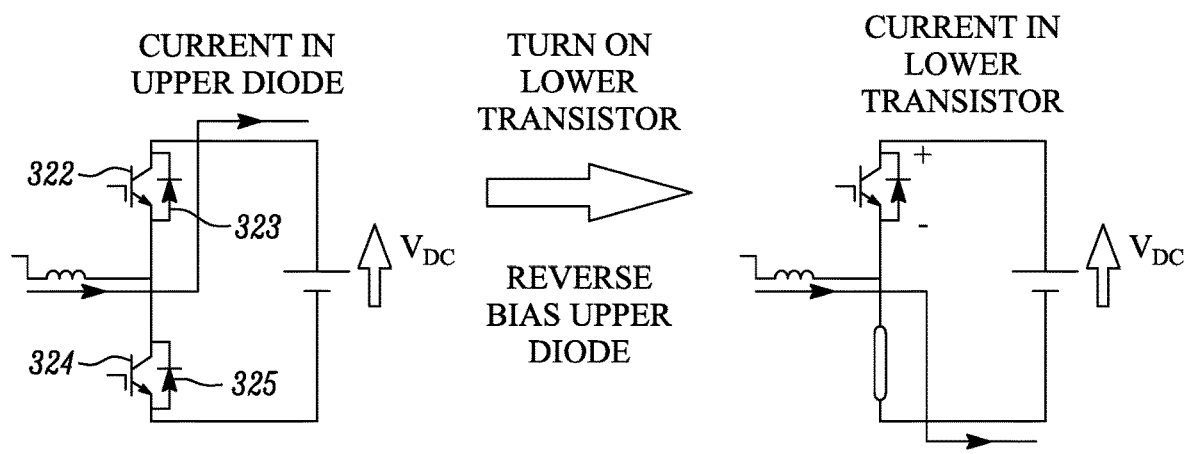
FIG. 3B illustrates how current is switched between the upper and lower branches of a phase leg of the converter to rectify AC to DC.

FIG. 3B shows, for one phase leg, the normal process of commutating from an upper diode 323 to a lower transistor 324. Initially current is flowing through the upper leg through the upper diode 323. By turning on the lower transistor 324 (as in the right-hand circuit), the DC side voltage is imposed across the conducting diode 323 in a reverse direction, which acts to turn off the diode 323 allowing conduction through the lower transistor. Thus, it can be seen that the DC side voltage is instrumental in commutating the diode 323 to its non-conducting state to permit commutation of the current to the lower branch.

Figure 4A:
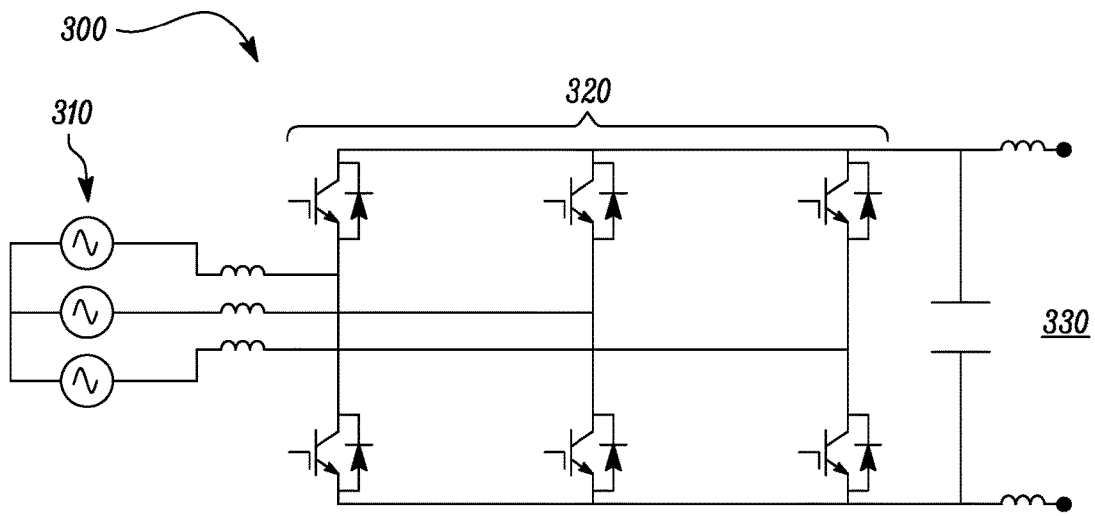
FIGS. 4A and 4B illustrate the effect of a DC network fault on an AC-DC converter.
Figure 4B:
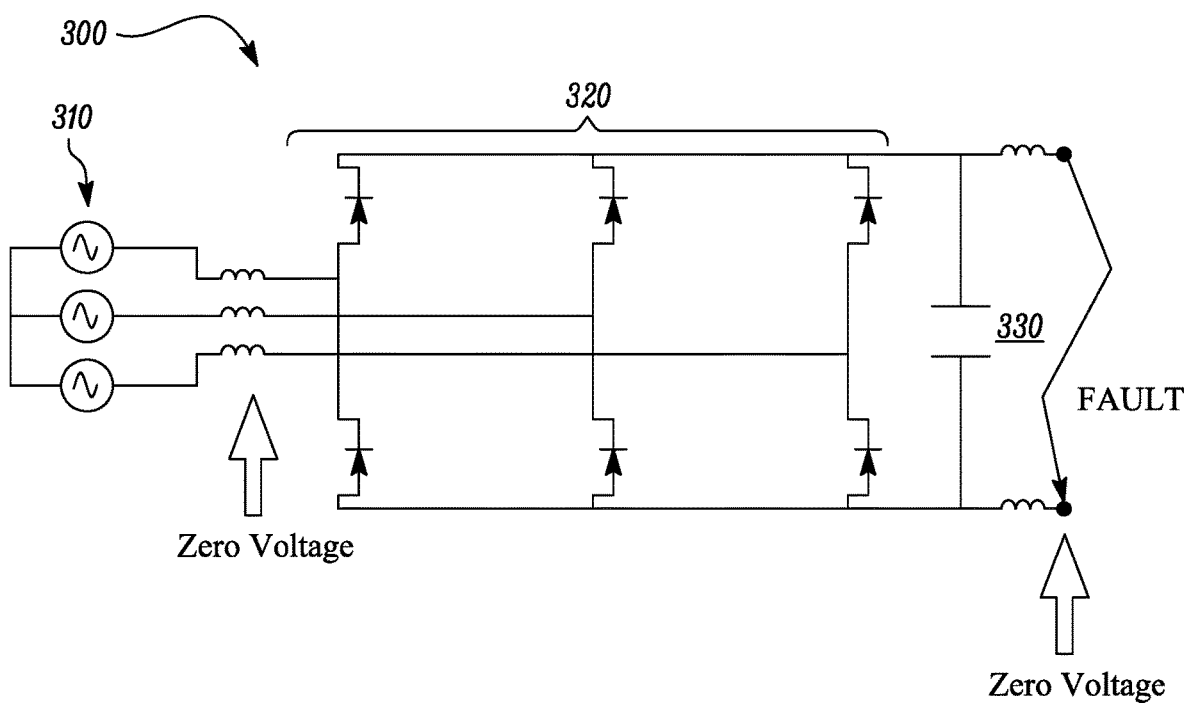

FIGS. 4A and 4B illustrate the effect of a DC network fault (e.g. a fault in a load connected in the DC network 330, which places a low impedance across the DC network terminals) on the operation of the electrical power system 300.

Following a fault in the DC network 330, the DC-side voltage collapses, possibly to zero Volts though in general the fault may have some resistance in which case the voltage may not collapse all the way to zero. The significance of this is that there is no voltage (or more generally only a small voltage) available to reverse bias the conducting diode (e.g. diode 323 in FIG. 3B) to turn it off. If the voltage is not large enough (and in general this cannot be guaranteed), the converter loses the ability to commutate current between the upper and lower branches of the phase legs 321a, 321b, 321c.

Another effect of the DC network fault is that the fault current supplied to the DC network 330 will be controlled almost exclusively by the voltage generated by the electrical machine 310 and the machine's impedance. The fault current supplied to the DC network 330 via the converter 320 will therefore typically be very large. For example, even for a 3-phase generator deliberately designed to have a high reactance to limit the output fault current of each phase to 500 $A_{RMS}$, the DC fault current contributed by 3-phases acting together would be approximately 707 A and would also contain a significant ripple component.

In view of the high fault current, it is common to switch off the active transistors in the event of a DC network fault, to protect them from over-current stress. This leaves the converter configuration illustrated in the circuit of FIG. 4B: the converter 320 will then operate as an uncontrolled diode rectifier. Briefly referring to FIG. 7A, this illustrates the 3-phase generator current output by the generator 310 and the waveform of the fault current supplied to the DC network 330 in the uncontrolled rectifier mode of operation.

In some systems the uncontrolled diode rectifier mode of operation is acceptable because the converter 320 is at least supplying current to the network 330. In other systems, however, in particular safety-critical aerospace systems, it would be highly desirable to have additional control over the level of current supplied to the DC network 330 following the fault.

Figure 5A:
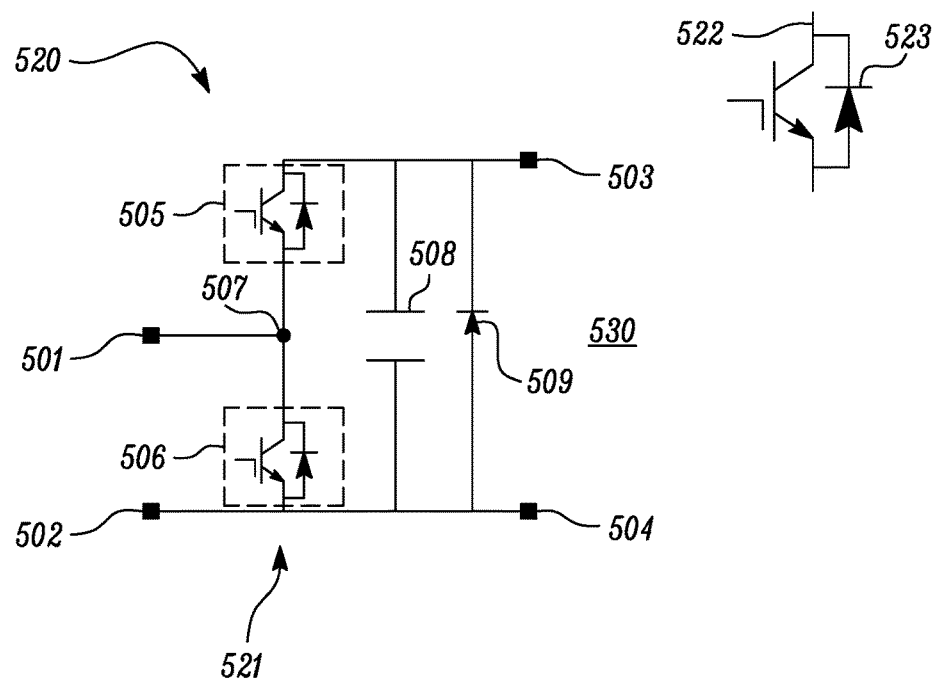
FIG. 5A illustrates an example single phase AC-DC converter.

FIG. 5A illustrates an example power electronics converter 520 for converting an input AC or DC supply to an output DC supply or vice versa. The power electronics converter 520 comprises first and second input terminals 501, 502 for connection to an AC or DC supply and first and second DC output terminals 503, 504 for connection to a DC network 530. A branch 521 between the DC output terminals 503, 504 comprises first and second semiconductor switches 505, 506 connected in series between the first and second DC output terminals 503, 504. The first input terminal 501 is connected to a node 507 between the first and second switches 505, 506. In the example illustrated in FIG. 5A, the second input terminal 502 is connected to the second DC output terminal 504. In the alternative example illustrated in FIG. 5C, the converter 520" is in the form of an H-bridge converter with first and second branches $521_1$, $521_2$. Each of the first and second branches $521_1$, $521_2$ comprises first and second semiconductor switches $505_1$, $505_2$, $506_1$, $506_2$ with a node $507_1$, $507_2$ between. The first input terminal 501 in this example is connected to the node $507_1$ between the first and second switches $505_1$, $506_1$ of the first branch $521_1$ and the second input terminal 502 is connected to the node $507_2$ between the first and second switches $505_2$, $506_2$ of the second branch $521_2$.

A DC link capacitor 508 is connected between the first and second DC output terminals 503, 504 for smoothing the DC voltage across the DC network 530. A reverse-biased DC link diode 509 is connected across the DC link capacitor 508 for providing a current bypass path in the event of a DC network fault that results in a short circuit between the output terminals 503, 504.

Each of the switches 505, 506 comprises a transistor 522 and reverse-biased diode 523, as also illustrated in FIG. 5A. The transistors may be IGBTs or may be bi-directional MOSFETs. The MOSFETs may be wide-bandgap MOSFETs comprising Silicon Carbide (SiC), though other suitable materials such as Gallium Nitride (GaN) or Gallium Arsenide (GaAs) could be used instead.

As will be understood by those skilled in the art, MOSFETs inherently have a diode character. This is usually referred to as the "body diode" or "weak body diode" of a MOSFET, and it is common to illustrate the body diode in a circuit illustration of a MOSFET. The diodes 523 illustrated in FIGS. 5A and 5B may therefore represent the body diode of a MOSFET, connected in parallel with the main transistor element 522 of the MOSFET. The switch thereby provides a bi-directional switchable conduction path between the source and drain terminals of the transistor 522. Each switch may alternatively comprise, in addition to its MOSFET with associated body diode, an additional separate reverse biased diode connected across the MOSFET. Omitting the separate diodes reduces component count and system mass but limits the MOSFET current carrying capacity. This is compensated for by the reverse-biased DC link diode 509, which is configured to withstand a high current resulting from a DC network fault condition. In example implementations, the DC link diode 509 may have a current carrying capacity around 5 to 10 times that of the switches 505, 506, which without the DC link diode would not be capable of carrying the peak currents following a DC link fault.

Figure 5B:
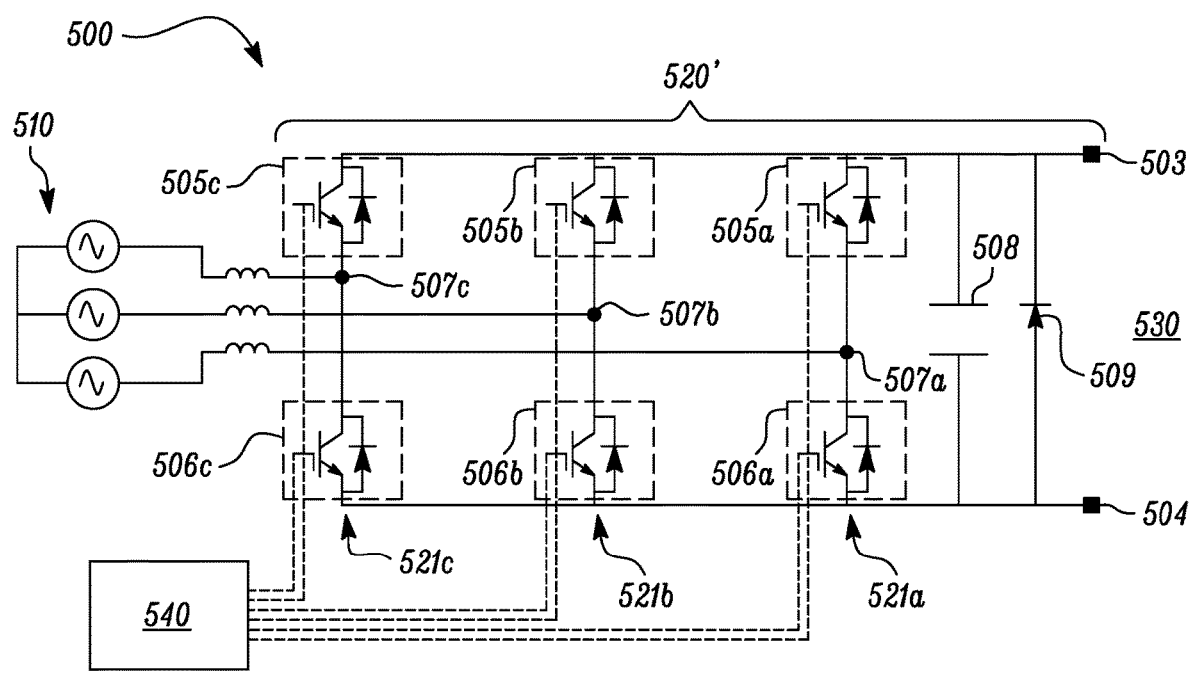
FIG. 5B illustrates an example electrical power system with a three phase AC-DC converter.
Figure 5C:
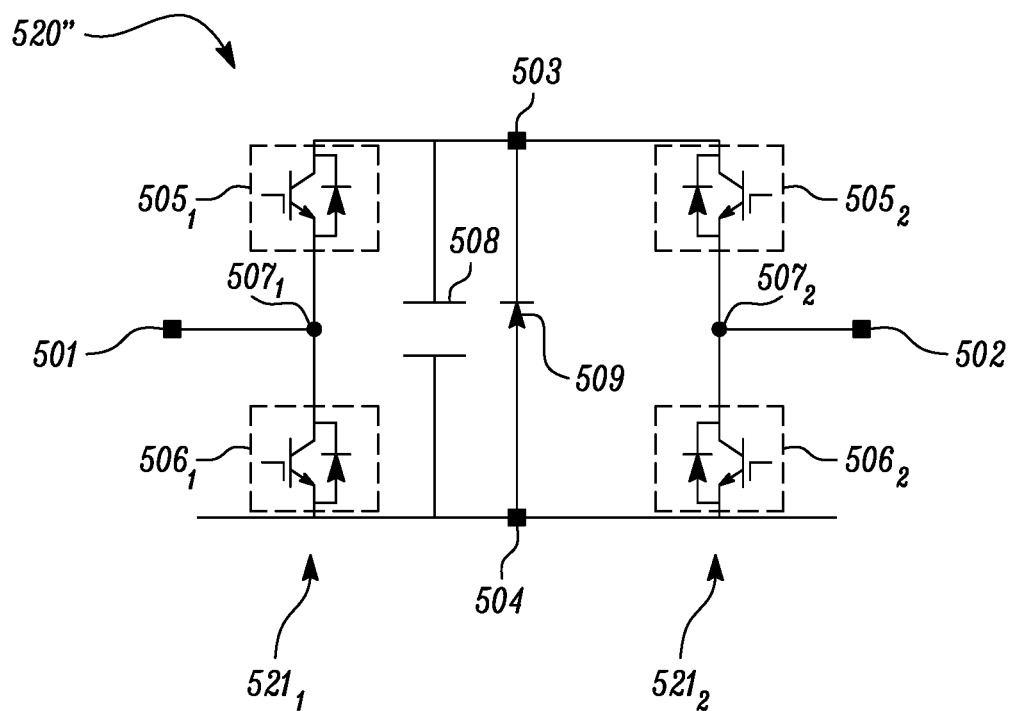
FIG. 5C illustrates an alternative example single phase AC-DC converter with an H-bridge configuration.

The power electronics converter 520 illustrated in FIG. 5A may comprise part of a power electronics converter 520' having multiple phases. FIG. 5B shows an example electrical power system 500 comprising an electrical machine 510 and a DC network 530 with a power electronics converter 520' of the type illustrated in FIG. 5A but comprising multiple phases. The power electronics converter 520' comprises a plurality of branches 521a-c, each branch having first and second switches 505a-c, 506a-c of the type described above in relation to FIG. 5A. A node 507a-c of each branch is connected to a respective phase of the electrical machine 510, which in the illustrated example is an AC motor or generator having a corresponding number of phases, in this case three phases.

A controller 540 controls operation of the power electronics converter 520', principally by controlling the switching operation of each of the switches 505a-c, 506a-c. During normal operation, the electrical power system 500 can be operated in essentially the same way as described above with reference to the electrical power system 300 of FIGS. 3A and 3B. Specifically, the controller 540 uses PWM control signals to commutate current between the diode of the first switch 505a-c of each branch 521a-c and the transistor (MOSFET) of the second switch 506a-c of each branch 521a-c. The DC network 530 provides the voltage required to reverse bias the diodes in the first switches 505a-c to allow for commutation of the AC current supplied by the electrical machine 510. This mode of operation does not make use of the bi-directional current carrying capability of MOSFETs when used in the switches 505a-c, 506a-c.

In an alternative mode of operation, which makes use of the bi-directional current capability of MOSFETs, the body diodes of each MOSFET are not used to conduct a majority of the current, although may conduct transiently during the very short commutation period. Current is commutated between the MOSFET of the first switches 505a-c conducting in a first direction (in this case the 'reverse' direction of the MOSFET) and the MOSFET of the second switches 506a-c conducting in a second opposite direction (in this case the 'forward' direction of the MOSFET). The controller 540 may switch between these two modes depending on the operating conditions of the electrical power system 500. For example, at lower operating currents (which may correspond to light loading of the DC network) the controller 540 may control the converter 520' to commutate current between the body diodes and MOSFETs, and switch to synchronous rectification mode once the operating current exceeds a predetermined limit.

It should be appreciated that the electrical power system 500 can also be operated in the synchronous rectifier mode, i.e. bi-directional conduction of the MOSFETs without conduction through the separate diodes, if present. However, higher switching frequencies may be attainable using the diodes so synchronous rectification may be less desirable in this system.

Figure 6A:
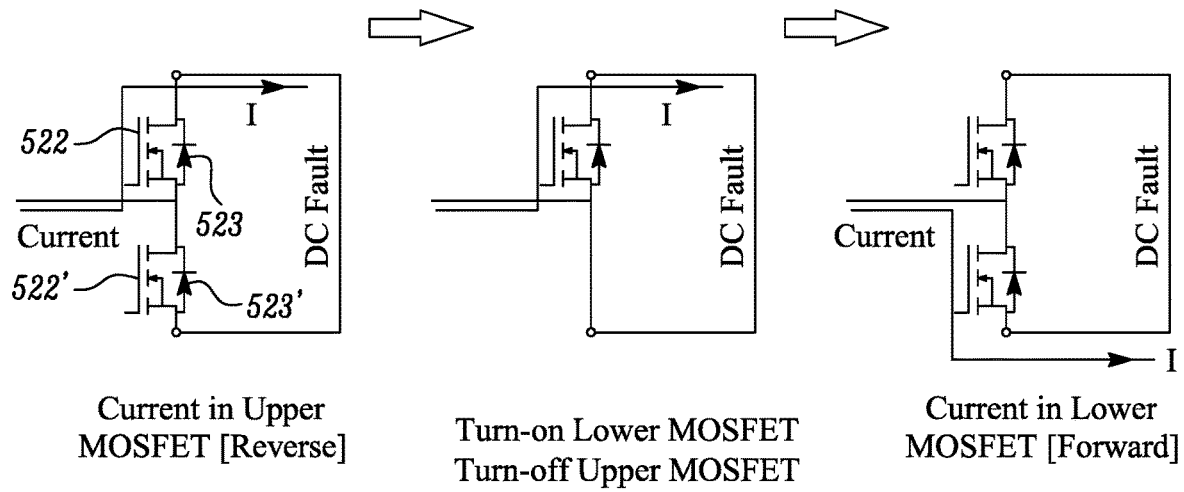
FIGS. 6A, 6B and 6C illustrate the operation of an example electrical power system in the presence of a fault in the DC electrical network.
Figure 6B:
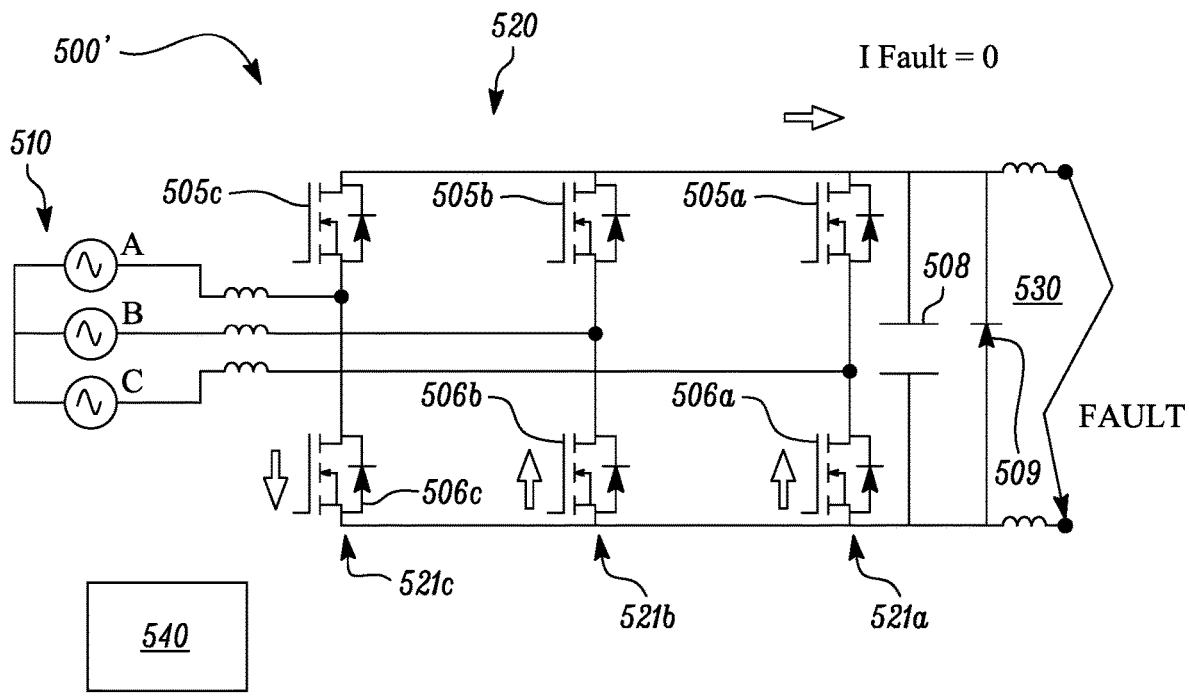
Figure 6C:
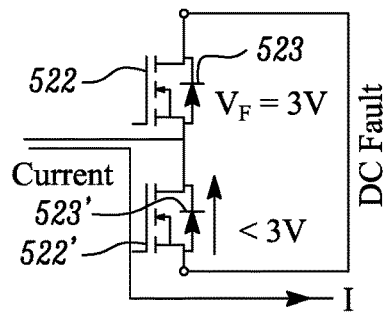

FIGS. 6A-6C illustrate how the electrical power system 500' may be controlled in response to a fault in the DC electrical network 430. Although the minimal converter topology 500' is shown in FIGS. 6A-6C, it should be appreciated that the following description may also be applied to a converter topology including separate diodes for each transistor.

As described above with reference to FIGS. 3A-3C and FIG. 4, a fault in the DC network will generally result in the DC-side voltage collapsing. This results in a loss of the diode-biasing voltage, which causes the converter to enter the uncontrolled diode rectifier mode shown in the lower circuit of FIG. 4. The same applies to MOSFET-based electrical power systems. As illustrated in FIG. 6A, when a DC network fault occurs the body diodes 523 (and separate diodes, if present) are not subject to the biasing voltage which is ordinarily leveraged to commutate current between the upper and lower switches. However, by utilising MOSFETs with bi-directional high current carrying capabilities, it remains possible to commutate current between the upper and lower switches. Specifically, even in the absence of a biasing voltage which turns off the forward conduction of the e.g. upper diode(s) 523, current can flow through the e.g. upper MOSFET 522 in the reverse direction because of its superior current carrying capability. In the first circuit in FIG. 6A, the converter is operating in the synchronous rectification mode when a DC network fault occurs. Rather than entering the uncontrolled rectifier state in which current would flow through the body diodes 523, 523', current can still be commutated to the lower MOSFET 522. This is illustrated in the second and third circuits of FIG. 6A.

Referring to FIG. 6B, following the fault in the DC network 430 and using the retained ability to commutate the current between the branches, the controller may control the switching of the MOSFETs to switch the converter into a 'crowbar' configuration such as the one shown in FIG. 6B. In such a crowbar configuration, the first switch 505a-c in each branch 521a-c is opened and one of the second switches 506c is closed to allow current to flow through the phases of the electrical machine 510 but not to the DC network 530. The fault current conducted to the DC network 530 can, at least temporarily, thereby be reduced to zero.

It will be appreciated that FIG. 6B illustrates a crowbar configuration in which current is conducted through the lower set of MOSFETs 506a-c such that current is contained in the lower half of the converter bridge. Alternatively, a crowbar configuration in which current is conducted through the upper set of MOSFETS 505a-c could be used, or indeed the controller 540 may switch the converter 520 between these two configurations.

FIG. 6C illustrates a condition for ensuring that the current can be successfully commutated between the upper and lower MOSFETS in the absence of a DC-side voltage suitable for biasing the diodes. It is again noted that FIG. 6C shows the minimal converter topology as an example, and that the following description could equally be applied to the converter topology with separate diodes.

Referring to the transition illustrated in the second and third circuits of FIG. 6A, this will only occur if the body diode 523 of the upper MOSFET 522 does not conduct the current. This requires that the voltage generated across the lower MOSFET 522' due to current flowing in a forward direction must be lower than the forwards voltage drop ($V_F$) of the upper MOSFET body diode 523. In the illustrated example, $V_F=3V$. Thus, to ensure current is commutated to the lower MOSFET 522', it is necessary that the voltage drop caused by the current and on-state resistance ($R_{DS-ON}$) of the MOSFET 522' remains below 3V. Consider the example where $R_{DS-ON}$ is 1.0 ms), which is a reasonable value for a modern SiC-based MOSFET. In this case the voltage drop will be below $V_F=3V$ provided that the fault current from the electrical machine does not exceed $V_F$ $R_{DS-ON}=3,000$ A. Thus, provided by the maximum rated fault current ($I_{FAULT, MAX}$) that can be output by the electrical machine in the limit where there is zero voltage across the terminals of the electrical machine (as could be the case where there a fault in the DC network) is no greater than 3,000 A, the fault current can always be commutated between the upper and lower branches of the converter.

More generally, current can always be commutated provided that the electrical machine 510 and converter 520 satisfy the equality:

$$\frac{V_F}{R_{DS-ON}} > I_{FAULT-MAX}$$

As noted above, $V_F$ is the forward voltage drop of the upper diode 523, $R_{DS-ON}$ is an on-state resistance of the lower MOSFET 522, and $I_{FAULT,MAX}$ is a maximum rated current that can be output by the electrical machine when there is zero voltage across its terminals. The forward voltage drop of the lower diode 523' will generally be the same as that of the upper diode 523, and the on-state resistance of the upper MOSFET 522 will generally be the same as that of the lower MOSFET 522.

The values of $V_F$ and $R_{DS-ON}$ vary between diodes and MOSFETs depending on component material, size, semiconductor doping and the like, and thus diodes and MOSFETs can be selected to satisfy the above inequality. $I_{FAULT,MAX}$ depends on the maximum terminal voltage of the electrical machine and the impedance of the electrical machine. The maximum terminal voltage depends on the design of the machine and the maximum rated speed of the machine, the latter of which is usually a design constraint. For example, the maximum speed may be the maximum rated speed of an engine drive shaft where a direct drive arrangement is used, or a gear ratio of the maximum rated speed of the engine drive shaft where a gearing arrangement is used. The impedance also depends on the machine design and to some extent can be controlled, for example by intentionally designing an electrical machine with a high reactance and thus a relatively high impedance to limit the maximum fault current. Thus, it is possible to design a system which satisfies the above inequality.

It should be appreciated that it is not essential that the electrical power systems described herein satisfy the inequality. Specifically, even if the inequality is not satisfied, the voltage drop of the lower MOSFET 522' during conduction may still be lower than $V_F$ for almost the entire operating envelope of the system. For instance, an electric machine directly driven by the HP spool of a gas turbine engine may have a maximum rated speed of 25,000 rpm, and the inequality may not be satisfied above 23,000 rpm. In this case the converter can still be commutated to and from the crowbar configuration for most of the operating envelope of the system.

Figure 7A:
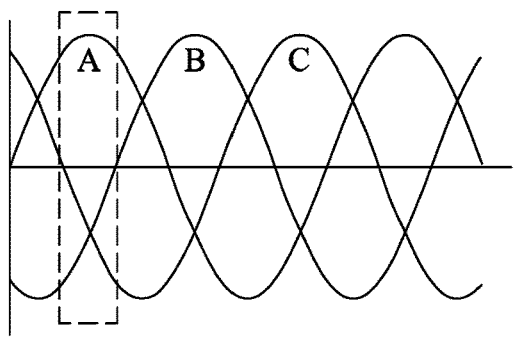
FIGS. 7A and 7B illustrate the waveform of a fault current supplied to a DC network following a fault, in the uncontrolled diode rectifier mode.
Figure 7A:
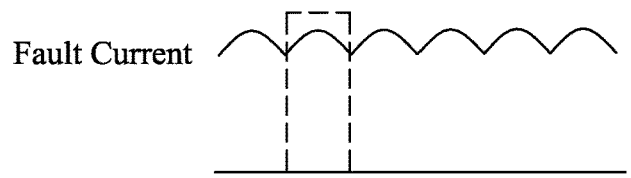

FIG. 7A illustrates the 3-phase AC-side current produced by a 3-phase electrical generator. The three phases are sinusoidal and offset from each other by 120 degrees. One 60-degree interval of one of the three phases (phase A) is highlighted within the dashed box.

Figure 7B:
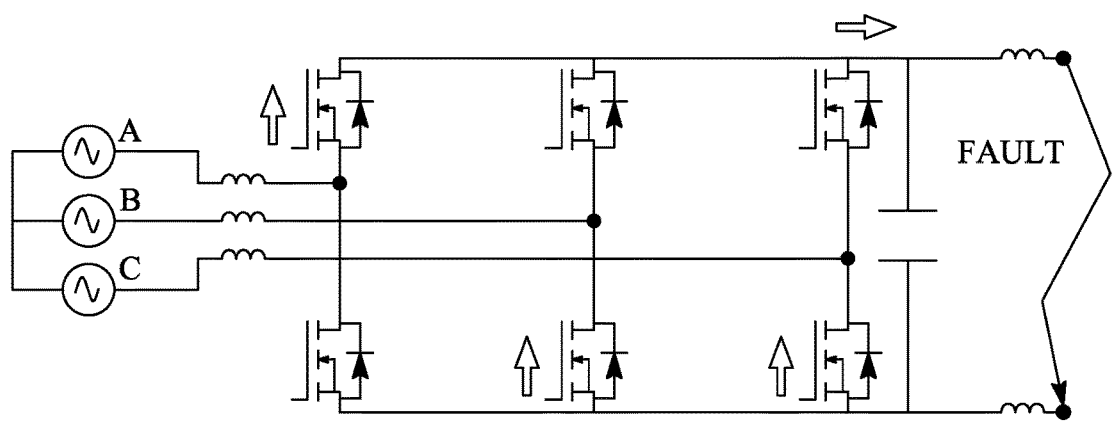

FIG. 7B illustrates the corresponding fault current delivered to the DC network when the converter operates as an uncontrolled diode rectifier, i.e. without utilising the invention described herein. The same 60-degree interval is highlighted in the right-hand graph.

Returning to the example electrical power system 500' illustrated in FIG. 6B, the function of the DC link diode 509 in the event of a DC network fault will now be described.

Figure 8A:
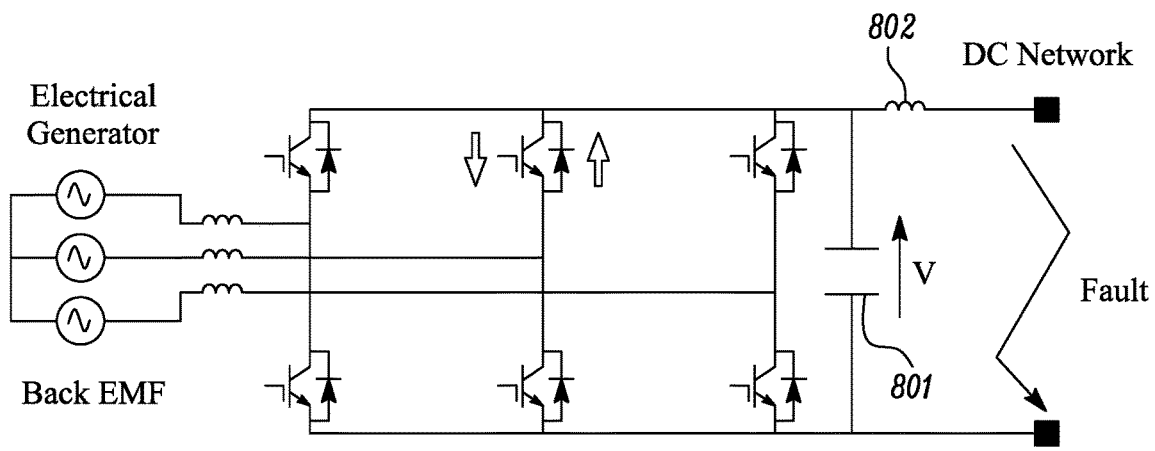
FIGS. 8A, 8B and 8C illustrate an example three phase electrical power system and current flows during a DC network fault.

At the instant of a DC network short circuit fault, there is an initial very high pulse of current delivered as a result of the DC link capacitor discharging its stored energy. In most cases, there is finite inductance between the DC capacitor of the AC to DC converter and the fault, meaning the current and voltage change at the natural oscillation frequency of the formed L-C circuit. This means the DC side voltage collapses and the DC side current increases, with both following a high frequency sinusoidal trajectory. This is illustrated schematically in FIGS. 8A, 8B and 8C. FIG. 8A illustrates an example of a conventional 2-level AC to DC converter comprising 6 transistors and 6 diodes connected in a 3-phase bridge configuration. In the DC network fault condition, when the DC voltage falls to zero (FIG. 8B) and, due to the stored energy in the LC circuit, goes negative (FIG. 8C), the anti-parallel diodes of the converter become forward biased and are forced into conduction, i.e. are turned on. This will occur at around the peak of the fault current, meaning that the converter diodes are subjected to a potentially damaging high transient current pulse. This initial pulse can be responsible for an increase in junction temperature across the converter semiconductors that is higher than that caused by the fault current that may follow. The converter therefore needs to be rated to withstand such a current.

It is normal for there to be a small amount of series inductance 801 contributed by the cables and filters (for example due to common mode & EMI filter components) connected between the converter DC link capacitor 802 and the fault. The current in the inductive components 802 cannot be extinguished instantaneously and carries on flowing. The peak fault current is controlled by the "surge impedance" $\sqrt{LC}$ and the initial DC capacitor voltage. Initiation of a DC fault will therefore cause the capacitance 801 and inductance 802 to "ring" at their natural oscillation frequency, f, i.e.:

$$f = \frac{1}{2\pi\sqrt{LC}}$$

It is known that under these circumstances the capacitive and inductive elements oscillate as they exchange their stored energy. So, neglecting power losses, at the point the capacitor voltage reaches zero, its initial stored energy of 0.5 $CV^2$ has been transferred to the inductance at $0.5LI^2$. It can be seen that at the zero voltage crossing point, the fault current is at its peak value.

Figure 8B:
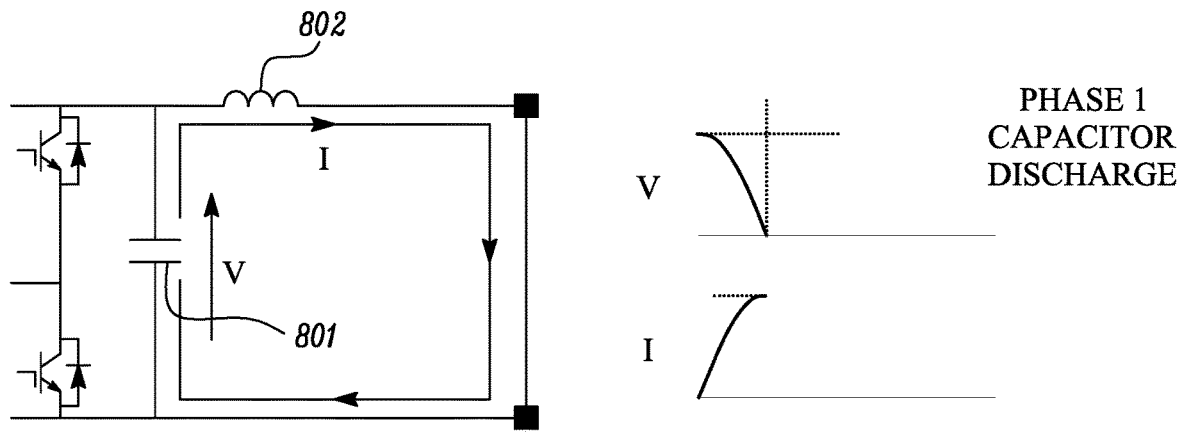
Figure 8C:
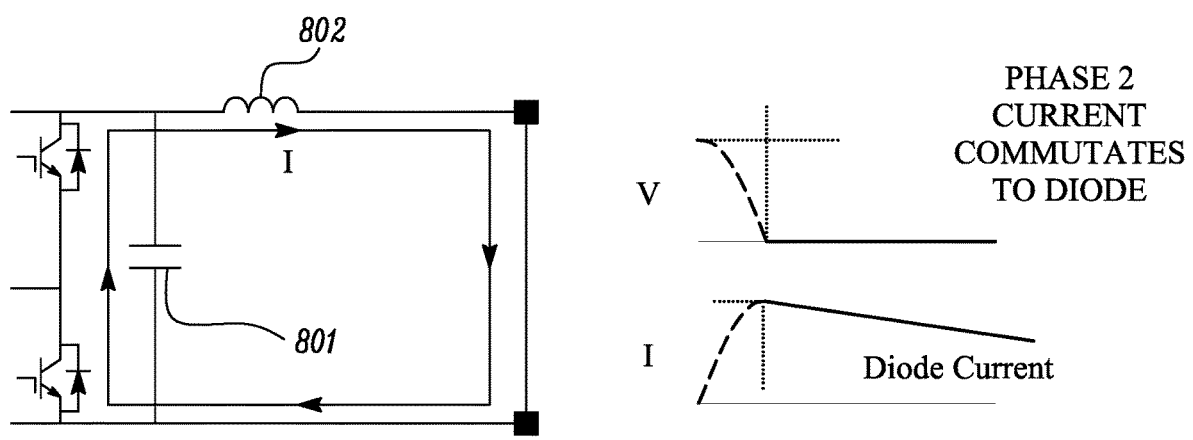

As the DC voltage crosses zero the converter anti-parallel diodes become forward biased and turn on, illustrated in FIG. 8C. This means the peak fault current contributed by the capacitor discharge is now commutated into the converter diodes, which will transiently experience a very high current stress. The situation is made considerably worse because the circuit changes from having its initial fast L-C oscillatory characteristic [for example, with a 200 μF and 1 μH, the resonant frequency f=11 kHz] to a much slower circuit as the capacitor is effectively taken out of circuit by the diode conduction. The high pulse of discharge current therefore gets "trapped" in the converter diodes and inductance and only decays as the inductive energy, which was initially stored in the DC capacitor 801, is dissipated in the diodes and in any other resistance in cables, bus-bars and filter components. Absorbing most of the stored energy in the diodes will tend to significantly increase the junction temperature of the diodes and may be damaging.

In practice, for a converter configured to handle power loads of tens of kW, the peak discharge current can be 1000's of Amperes, which may be difficult for the diodes in the converter to conduct and sustain without damage. Current practice to address the above issue is to implement high-current diodes within the converter to tolerate this current stress and/or add additional inductance at the DC output terminals of the converter. The inductance increases the "surge impedance" of the circuit, which reduces the peak discharge current but is undesirable, particularly in aerospace applications, because of the added weight and size penalty it incurs.

Because this initial current surge is likely to define the maximum pre-fault junction temperature of the power modules, any further converter optimization is limited by the fault response.

Moreover, modern semiconductors based on Wide Band Gap technologies, such as SiC MOSFETS, rely on the intrinsic built in body diodes, which tend to be weaker than the usual discrete freewheeling diodes typically used in traditional power modules.

Figure 9B:
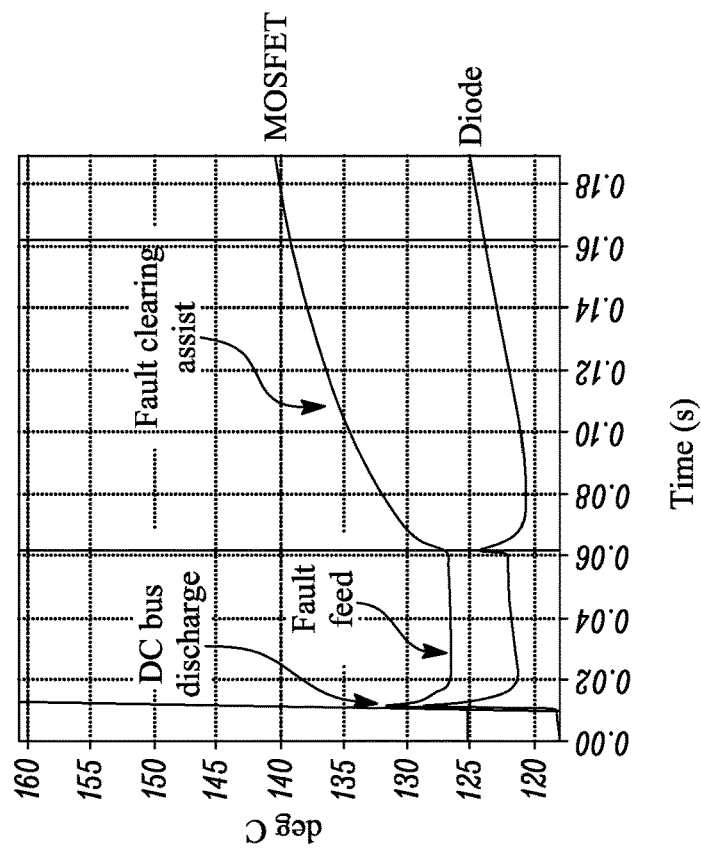
FIG. 9B is a plot of MOSFET and diode junction temperature over time following a DC network fault.
Figure 9A:
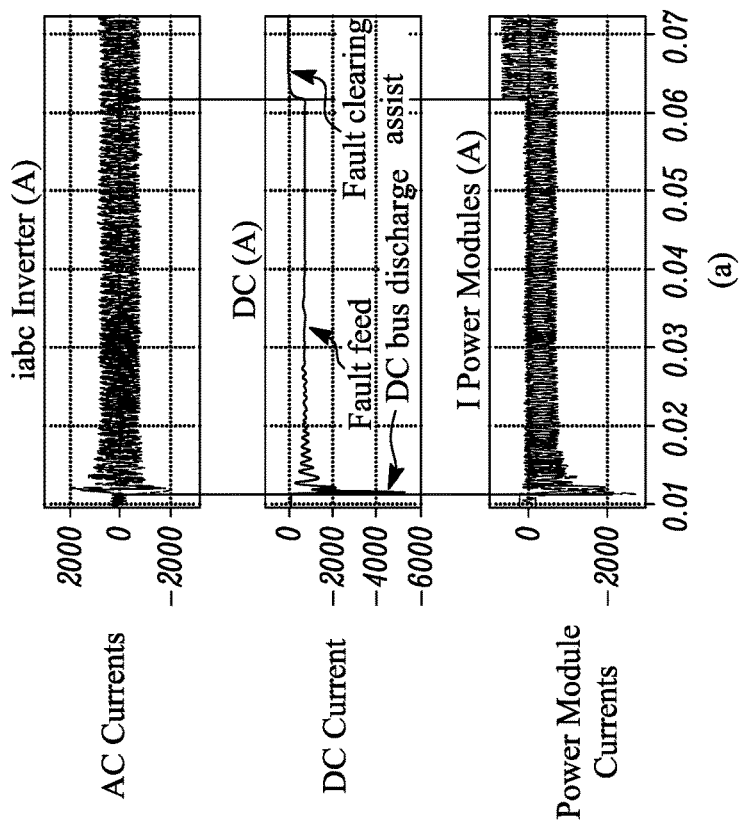
FIG. 9A is a plot of current over time for an example electrical power system following a DC network fault.

FIGS. 9A and 9B illustrate simulation results from model Electric Starter Generator (ESG) electric power converter system rated at around kW. This shows a high current surge discharged by the DC link capacitor of around 5000 A, which then commutates to the converter diodes. A thermal model, illustrated in FIG. 9B, shows a significant increase in the junction temperature of the converter diodes and MOSFETs at the instant of DC capacitor discharge, resulting in a temperature rise up to around 130° C. Three stages of the fault response are shown in FIGS. 9A and 9B. A first stage involves the initial DC bus/DC capacitor discharge, followed by a second fault infeed stage where current is injected to the fault to enable downstream protection to operate, followed by a final third fault clearing assist stage where the converter is operated in a crowbar mode to remove current from the opening DC contactors.

Figure 10:
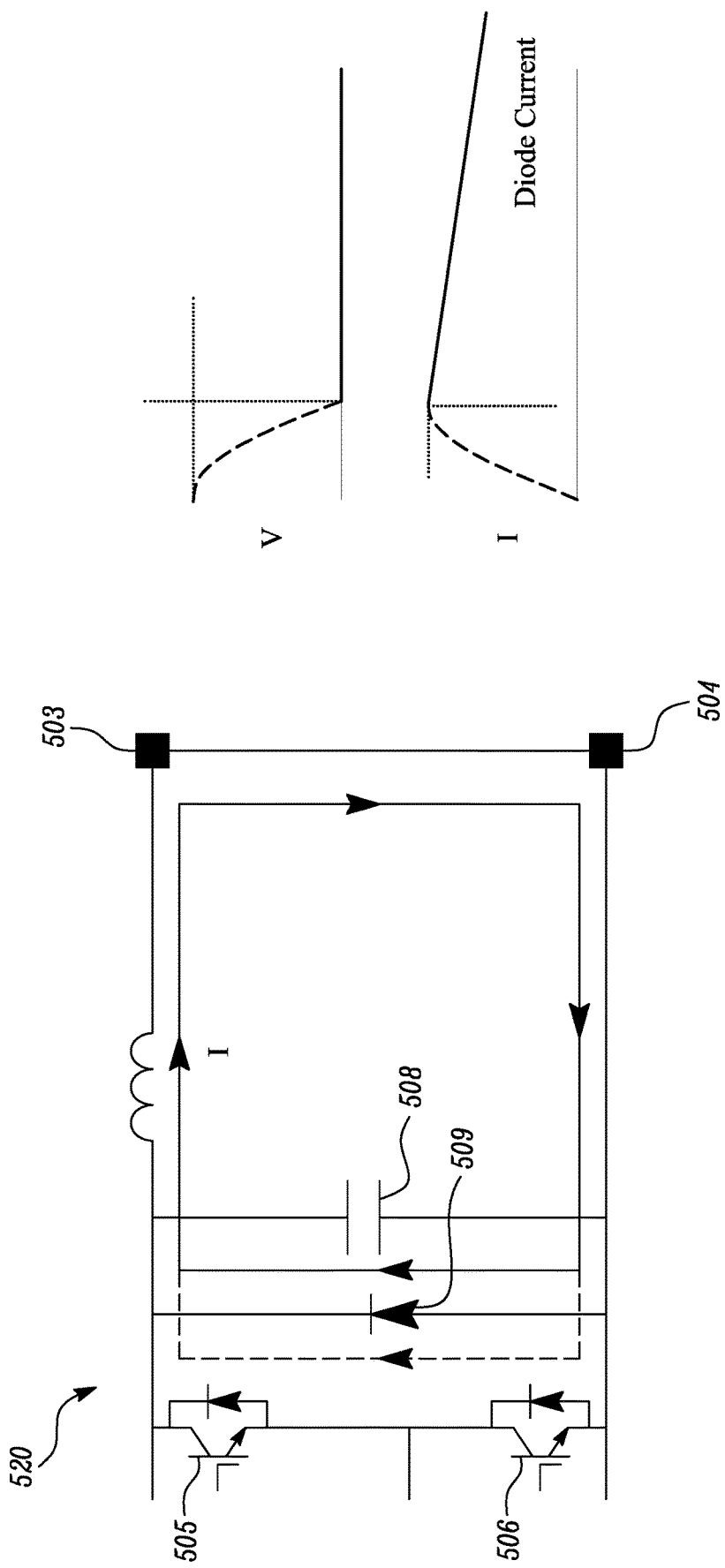
FIG. 10 is a schematic diagram of an example power electronics converter indicating current flows during a DC fault.

The effect of adding a reverse-biased DC link diode 509 directly across the DC terminals 503, 504 of a power electronics converter 520 is illustrated in FIG. 10. The converter 520 is similar to that illustrated in FIG. 5A. The additional DC link diode 509 is added close to the DC link capacitor 508 and may be external to the power module containing the semiconductor switches 505, 506 or may be integrated within the power module. The DC link diode 509 causes the high discharge current to preferentially flow through the DC link diode rather than through the converter diodes. The additional diode 509 is designed and rated to carry the required pulse current. Importantly, this diode 509 is not used during normal AC to DC power conversion and only conducts when the DC side voltage collapses and tries to go negative. As such, the starting junction temperature of the DC link diode 509 will tend to be lower than that of the converter diodes during normal operation and will therefore have more capacity to absorb the energy stored in the circuit inductance without exceeding its maximum junction temperature. If the forward voltage-drop of the conducting additional diode 509 remains lower than the combined forward voltage drop of the two converter diodes connected in series, the fault current will remain entirely within the additional diode 509.

Modern high-power aerospace converters may use semiconductor components made from silicon carbide, which offer benefits over traditional silicon-based devices. These benefits include higher temperature capability and higher switching frequencies, which are important for realising power dense converters for aerospace application. SiC transistors are currently available as MOSFETs rather than IGBTs, which tend to be the preferred Si devices for high power AC to DC conversion. MOSFETs are generally superior over IGBTs in that they can be controlled to conduct current in their reverse direction [diode direction]. Due to this capability, a MOSFET-based AC to DC converter may be operated during a DC fault condition by turning on the MOSFETS in the upper and lower portions of each converter bridge or branch as the DC voltage collapses and approaches its zero voltage condition. The initial high pulse current from discharge of the DC capacitor 508 may thereby be shared between the converter diodes and reverse conducting MOSFETS such that each device experiences less current stress and so achieves a lower junction temperature. Care has to be taken not to cause a shoot-through condition in the converter which might cause MOSFET damage if the transistors in the upper and lower arms of the same phase leg are turned on together in the presence of a DC voltage and with significant capacitor stored energy. To avoid this possibility, if the turn-on is controlled to happen at low levels of DC voltage, then the MOSFETS and diodes could be made to share the high discharge current pulse.

In some applications, the converter MOSFETS and diodes may have sufficient current/thermal capacity such that the additional diode 509 is not required. This is more relevant for multiple phase converters, for example a converter 520' having three branches as shown in FIG. 5B. Current can thereby be shared between the MOSFETs and anti-parallel diodes, giving six parallel paths for current sharing. However, the use of the additional diode 509 provides additional transient current carrying capability that enables the MOSFETs and any associated diodes in the converter branches to be resized according to normal operating conditions rather than peak currents during a DC fault condition.

Figure 11:
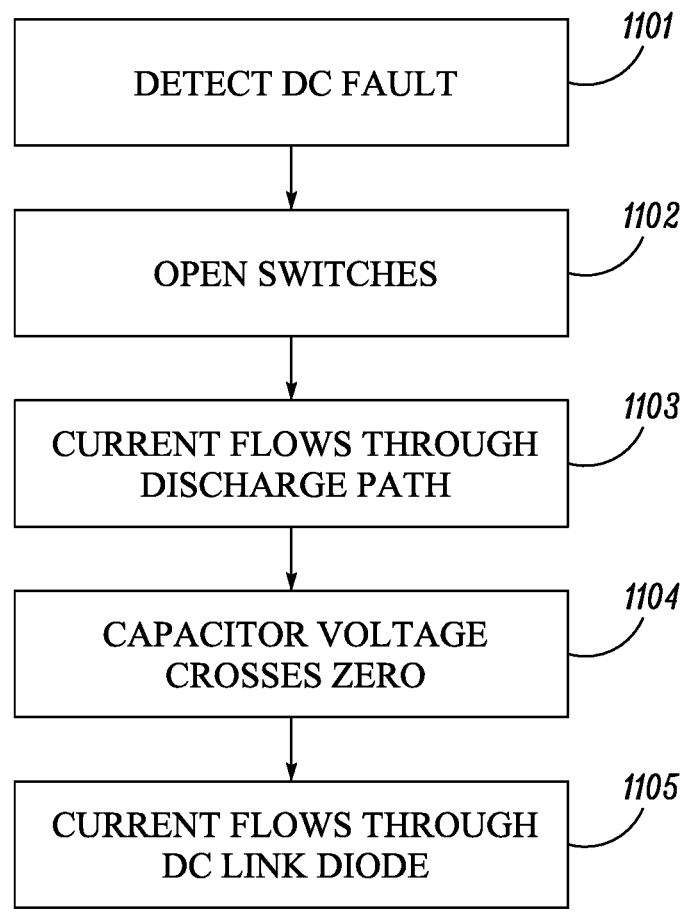
FIG. 11 is a schematic flow diagram illustrating a sequence of operations in an example power electronics converter in the event of a DC fault.

FIG. 11 is a flow chart illustrating an example sequence of operations for the electrical power system 500 shown in FIG. 5B. During normal operation prior to a DC fault, the controller 540 operates the power electronics converter 520' to convert an AC supply provided by the electrical machine to a DC supply across the DC output terminals 503, 504. The controller 540 also continually monitors the DC network to detect a DC fault, for example by detecting a voltage across the output terminals 503, 504. In a first step 1101, a DC fault is detected, for example by the controller 540 detecting a drop in DC voltage across the terminals below a threshold level.

In a second step 1102, the controller 540 opens all of the switches 505a-c, 506a-c to prevent excessive currents flowing through the transistors 522 in each switch and, in step 1103, enabling current from the DC link capacitor 508 to flow through a discharge path defined by the DC fault, the capacitor 508 and through any associated inductance (see FIG. 8B). In step 1104, the voltage across the capacitor cross zero and the DC link diode 509 begins to conduct. Current then flows through the DC link diode 509 in step 1105, dissipating further energy without flowing through the switches, or at least to a lesser extent.

In most cases the initial discharge of the DC capacitor and associated commutation of high pulse current to the DC link diode 509 as shown in FIG. 10 requires no control action. Here the DC link diode 509 is rated to conduct the current for the time needed for the energy initially stored in the DC link to be dissipated. The controller may however turn-on all upper and lower MOSFETs [e.g. all six MOSFETs for the converter 520' of FIG. 5B] at a low voltage condition so that any fault current spilling to the converter [shown for example in FIG. 8C] does not inadvertently flow only in the "weak" body diodes causing excessive heating. If the converter transistors have discrete anti-parallel diodes and the DC link diode is present it may not be necessary to turn-on the MOSFETs. If IGBTs are used, the anti-parallel diodes will be present.

The initial high discharge current transient is fed from energy stored in the DC link capacitor. There is a lower but potentially significant continuous "follow-on" current fed from the AC side as shown in FIG. 7A. This may flow in the transistors and diodes. Converter control action may be used to turn-on MOSFETs to allow current to flow in both the forward and reverse directions [e.g. crow-bar] or predominately in the reverse direction to replace body-diode conduction [i.e. synchronous rectification]. During this time, normally only three MOSFETs are turned on at any one time.

The continuous fault current [see FIG. 7A] will flow until the fault is isolated by the operation of protection in the DC network. Solid state protection may operate extremely quickly [micro-seconds], mechanical contactors open in 10's of milliseconds and thermal may take longer to melt and clear the fault. The exact times are dependent on the design of the overall system protection taking into account the need to discriminate fault locations so that only the faulty elements are isolated rather than tripping off the entire network and loads.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

It should also be noted that whilst the embodiments have been described with reference to an aircraft, and to turbofan engines, it will be understood that the principles of the described electrical systems may be applied to other installations, for example to aircraft with turboprop engines, aircraft with purely electric power and propulsion systems, to marine environments such as on a naval vessel powered by gas turbines, a hybrid system or purely electric system, and to other transport applications including trains.

The invention claimed is:

1. An electrical power system comprising:
an electrical machine;
a DC network;
a controller; and
an AC to DC power electronics converter comprising:
first and second input terminals;
first and second DC output terminals;
a branch comprising first and second semiconductor switches, each of the first and second semiconductor switches comprising a transistor connected in anti-parallel with a diode, the diode being either a discrete diode or a body diode of a MOSFET. the first and second semiconductor switches being connected in series between the first and second DC output terminals, and the first input terminal being connected to a node between the first and second semiconductor switches;
a DC link capacitor connected directly across the first and second DC output terminals; and
a reverse biased DC link diode connected directly across the DC link capacitor and directly across the first and second DC output terminals,
wherein the electrical machine is connected to the node of the DC power electronics converter and the DC network is connected across the first and second DC output terminals,
wherein the controller is configured to provide switching signals to each switch of the DC power electronics converter,
wherein the controller is further configured to detect a DC fault in the DC network with the DC fault causing the DC link capacitor to discharge, and, upon detecting the DC fault, open each of the first and second semiconductor switches until a detected DC voltage level across the DC network falls below a predefined threshold, and
wherein the DC link diode is rated so that, when the DC voltage level goes negative due to the discharge of the DC link capacitor, a forward voltage drop of the DC link diode is lower than a combined forward voltage drop of the diodes of the branch, whereby current from the discharge of the DC link capacitor preferentially flows through the DC link diode.

2. The electrical power system of claim 1, wherein the controller is further configured, upon detecting that the DC level across the DC network has fallen below the predefined threshold, to control the first and second semiconductor switches to place the AC to DC power electronics converter in a crowbar configuration.

3. The electrical power system of claim 1, wherein the reverse biased DC link diode has a current carrying capacity of between 5 and 10 times that of the first and second semiconductor switches.

4. The electrical power system of claim 1, wherein the transistor is an IGBT or MOSFET.

5. The electrical power system of claim 1, wherein the first and second semiconductor switches each consist of a MOSFET, the diode being a body diode of the MOSFET.

6. The electrical power system of claim 1, wherein the second input terminal is connected to the second DC output terminal.

7. The electrical power system of claim 1, wherein the branch is a first branch, the DC power electronics converter comprising a second branch comprising first and second semiconductor switches connected in series between the first and second DC output terminals, the second input terminal connected to a node between the first and second semiconductor switches of the second branch.

8. The electrical power system of claim 1, wherein the DC power electronics converter is rated to convert over 30 kW of electrical power.

9. The electrical power system of claim 1, wherein the DC power electronics converter comprises a plurality of branches connected between the first and second DC output terminals, the node between the first and second semiconductor switches of each branch being connectable to a respective phase of an electrical machine.

10. The electrical power system of claim 1, wherein the electrical machine comprises a plurality of phases and the DC power electronics converter comprises a respective plurality of branches connected between the first and second DC output terminals, each phase of the electrical machine being connected to the node between the first and second semiconductor switches of a respective branch of the DC power electronics converter.

11. The electrical power system of claim 10, wherein the electrical machine comprises three phases.

12. The electrical power system of claim 11, wherein the DC power electronics converter comprises three branches.

13. An aircraft power and propulsion system comprising:
a gas turbine engine; and
an electrical power system according to claim 1,
wherein the electrical machine of the electrical power system is mechanically coupled with a spool of the gas turbine engine.

14. An aircraft comprising the aircraft power and propulsion system of claim 13.

15. The aircraft of claim 14, wherein the aircraft is a hybrid electric aircraft.

16. The electrical power system of claim 5, wherein a current capacity of the DC link diode is between 5 and 10 times greater than that of the body diode of each MOSFET.

* * * * *